(12) United States Patent
Dopker et al.

(10) Patent No.: US 11,524,761 B2
(45) Date of Patent: Dec. 13, 2022

(54) STRINGER-FRAME INTERSECTION OF AIRCRAFT BODY

(71) Applicant: The Boeing Company, Chicago, IL (US)

(72) Inventors: Bernhard Dopker, Bellevue, WA (US); Richard R. Rosman, Seattle, WA (US); Robert W. Johnson, Renton, WA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 15/373,680

(22) Filed: Dec. 9, 2016

(65) Prior Publication Data

US 2018/0162510 A1 Jun. 14, 2018

(51) Int. Cl.
*B64C 1/06* (2006.01)

(52) U.S. Cl.
CPC .............. *B64C 1/061* (2013.01); *B64C 1/064* (2013.01)

(58) Field of Classification Search
None
See application file for complete search history.

(56) References Cited

U.S. PATENT DOCUMENTS

| | | | | |
|---|---|---|---|---|
| 5,518,208 A * | 5/1996 | Roseburg | ................ | B64C 1/064 244/119 |
| 6,511,570 B2 * | 1/2003 | Matsui | ................. | B29C 70/345 156/245 |
| 6,520,706 B1 * | 2/2003 | McKague, Jr. | ......... | B64C 1/065 403/265 |
| 6,648,273 B2 * | 11/2003 | Anast | ...................... | B64C 1/068 244/119 |
| 7,134,629 B2 * | 11/2006 | Johnson | ............... | B61D 17/041 244/119 |
| 7,159,822 B2 * | 1/2007 | Grantham | ................. | B64C 1/12 244/119 |

(Continued)

FOREIGN PATENT DOCUMENTS

| | | |
|---|---|---|
| CN | 105314091 | 2/2016 |
| EP | 2977313 | 1/2016 |
| JP | 2016534295 | 11/2016 |

(Continued)

OTHER PUBLICATIONS

Extended European Search Report for European Patent Application No. 17194646.0 dated Mar. 27, 2018.

(Continued)

*Primary Examiner* — Marc Burgess
(74) *Attorney, Agent, or Firm* — Kunzler Bean & Adamson

(57) ABSTRACT

Disclosed herein is a body of a mobile vehicle. The body includes skin, a stringer, and a frame. The skin comprises a first tab and a second tab, opposite the first tab. The first tab is fixed directly onto the skin and the second tab is fixed directly onto the skin. The frame comprises a cut-out, a first foot, and a second foot. The second foot is spaced apart from the first foot by the cut-out. The first foot is fixed directly onto the first tab of the stringer, such that the first tab of the stringer is immediately interposed between the first foot of the frame and the skin. The second foot is fixed directly onto the skin, such that no portion of the frame is fixed directly onto the second tab of the stringer.

20 Claims, 9 Drawing Sheets

(56) References Cited

U.S. PATENT DOCUMENTS

| | | | |
|---|---|---|---|
| 7,963,483 B2* | 6/2011 | Roming | B29D 99/0003 244/119 |
| 8,910,908 B2* | 12/2014 | Roming | B64C 1/061 244/119 |
| 9,545,989 B2* | 1/2017 | Guimard | B64C 1/062 |
| 10,029,780 B2* | 7/2018 | Ross | B64C 3/26 |
| 2006/0226287 A1 | 10/2006 | Grantham et al. | |
| 2008/0128550 A1 | 6/2008 | Roming et al. | |
| 2010/0252684 A1 | 10/2010 | Stephan | |
| 2012/0153082 A1* | 6/2012 | Rosman | B64C 1/068 244/120 |
| 2015/0041589 A1* | 2/2015 | Hasan | B64C 3/182 244/119 |
| 2015/0375843 A1* | 12/2015 | Griess | B64C 3/182 244/133 |
| 2016/0009367 A1* | 1/2016 | Marks | B64C 3/26 244/45 R |
| 2016/0176500 A1 | 6/2016 | Ross et al. | |

FOREIGN PATENT DOCUMENTS

| | | |
|---|---|---|
| WO | 2006001859 | 1/2006 |
| WO | 2011134917 | 11/2011 |

OTHER PUBLICATIONS

Brazilian Office Action concerning Brazil Patent Application No. BR102017024495 dated Oct. 22, 2021.

Chinese Office Action concerning Chinese Patent Application No. 2017111116062 dated May 13, 2022.

Japanese Office Action concerning Japanese Patent Application No. 2017-218707 dated Oct. 5, 2021.

\* cited by examiner

STRINGER-FRAME INTERSECTION OF AIRCRAFT BODY

FIELD

This disclosure relates generally to a body of a mobile vehicle, such as an aircraft, and more particularly to the intersection of stringers and frames forming part of the body.

BACKGROUND

The body of an aircraft typically includes multiple stringers and frames intercoupled with each other and fixed to a skin. The intersection of a stringer and frame is designed to help transfer loads between the stringer, frame, and skin to help strengthen, reduce fatigue, and improve inspection and damage tolerance of the body. Some conventional stringer-frame intersections fail to transfer loads in a manner sufficient to adequately provide the above-mentioned benefits. Accordingly, certain conventional stringer-frame intersections employ clips that couple together the stringers with the frames to promote an additional load path between the frames and stringers. Moreover, many conventional stringer-frame intersections are difficult to assemble, particularly those that employ clips, which can result in an increase in manufacturing costs. Additionally, the configuration of some conventional stringer-frame intersections tend to induce load into and hide parts susceptible to cracking, which makes it difficult to visually detect cracks formed in such parts.

SUMMARY

The subject matter of the present application has been developed in response to the present state of the art, and in particular, in response to the problems and disadvantages associated with the stringer-frame intersections of the body of an aircraft, that have not yet been fully solved by currently available techniques. Accordingly, the subject matter of the present application has been developed to provide a system and apparatus that overcome at least some of the above-discussed shortcomings of prior art techniques. More specifically, in one implementation, a stringer-frame intersection is disclosed that efficiently transfers loads between the stringer, frame, and skin, without the use of clips, and provides convenient visual access to more parts of the stringer-frame intersection for the visual detection of cracks and other abnormalities.

Disclosed herein is a body of a mobile vehicle. The body includes skin, a stringer, and a frame. The stringer comprises a first tab and a second tab, opposite the first tab. The first tab is fixed directly onto the skin and the second tab is fixed directly onto the skin. The frame comprises a cut-out, a first foot, and a second foot. The second foot is spaced apart from the first foot by the cut-out. The first foot is fixed directly onto the first tab of the stringer, such that the first tab of the stringer is immediately interposed between the first foot of the frame and the skin. The second foot is fixed directly onto the skin, such that no portion of the frame is fixed directly onto the second tab of the stringer. The preceding subject matter of this paragraph characterizes example 1 of the present disclosure.

The second tab of the stringer tapers in a direction away from the first tab of the stringer.

The preceding subject matter of this paragraph characterizes example 2 of the present disclosure, wherein example 2 also includes the subject matter according to example 1, above.

The first tab of the stringer tapers in a direction away from the second tab of the stringer.

The preceding subject matter of this paragraph characterizes example 3 of the present disclosure, wherein example 3 also includes the subject matter according to example 2, above.

The first foot of the frame is angled at a first angle relative to the second foot of the frame. The first angle complements the taper of the first tab. The preceding subject matter of this paragraph characterizes example 4 of the present disclosure, wherein example 4 also includes the subject matter according to example 3, above.

The stringer is elongate in a first direction. The stringer further comprises a first web, having a first side and a second side, opposite the first side. The first tab is coupled to and extends from the first side of the first web. The second tab is coupled to and extends from the second side of the first web. The first tab extends from the first side of the first web in a direction opposite that of the second tab from the second side. The frame is elongate in a second direction, perpendicular to the first direction, and spans the stringer such that the stringer is interposed between the frame and the skin. The frame further comprises a second web, the cut-out being formed in the second web. The first web of the stringer passes through the cut-out of the frame. The first foot of the frame is coupled to and extends from the second web at a first side of the cut-out. The second foot of the frame is coupled to and extends from the second web at a second side of the cut-out. The second side of the cut-out is spaced apart from the first side of the cut-out in the second direction. The preceding subject matter of this paragraph characterizes example 5 of the present disclosure, wherein example 5 also includes the subject matter according to any one of examples 1-4, above.

A first maximum distance from the first tab of the stringer to the second tab of the stringer in the second direction is greater than a second maximum distance between the first foot of the frame and the second foot of the frame in the second direction. The preceding subject matter of this paragraph characterizes example 6 of the present disclosure, wherein example 6 also includes the subject matter according to example 5, above.

An entirety of the cut-out is divided into a first portion and a second portion. The first portion of the cut-out has a semi-bulb shape along a first plane parallel to the second direction and parallel to a third direction, perpendicular to the first direction and the second direction. The second portion of the cut-out has a semi-U shape along the first plane. The first web of the stringer is closer to the first portion than the second portion. The preceding subject matter of this paragraph characterizes example 7 of the present disclosure, wherein example 7 also includes the subject matter according to any one of examples 5 and 6, above.

A first portion of the first foot of the frame is flush against the skin and comprises a groove that defines a gap between a second portion of the first foot and the skin. The first tab of the stringer is positioned within the gap. An entirety of the second foot of the frame is flush against the skin. The preceding subject matter of this paragraph characterizes example 8 of the present disclosure, wherein example 8 also includes the subject matter according to any one of examples 1-7, above.

Also disclosed herein is a stringer of a body of a mobile vehicle. The stringer includes a first web, elongate in a first direction and having a first side and a second side, opposite the first side. The stringer also includes a first flange extending from the first side of the first web, parallel to a second direction perpendicular to the first direction, along an entire length of the first web. The stringer additionally includes a first tab coupled to and extending, parallel to the second direction, from the first flange. The stringer further includes a second tab coupled to and extending, parallel to the second direction, from the second side of the first web. The second tab tapers in a direction away from the first tab. The preceding subject matter of this paragraph characterizes example 9 of the present disclosure.

The first tab tapers in the second direction away from the second tab. The preceding subject matter of this paragraph characterizes example 10 of the present disclosure, wherein example 10 also includes the subject matter according to example 9, above.

The second tab tapers at an angle between about 0-degrees and about 10-degrees. The preceding subject matter of this paragraph characterizes example 11 of the present disclosure, wherein example 11 also includes the subject matter according to any one of examples 9 and 10, above.

A first combined width of the first flange and the first tab is greater than a second width of the second tab. The preceding subject matter of this paragraph characterizes example 12 of the present disclosure, wherein example 12 also includes the subject matter according to any one of examples 9-11, above.

A first thickness of the first flange adjacent the first tab in the second direction is greater than a first thickness of the first flange adjacent the first tab in the first direction. The preceding subject matter of this paragraph characterizes example 13 of the present disclosure, wherein example 13 also includes the subject matter according to any one of examples 9-12, above.

A thickness of the first flange, at the first tab and immediately adjacent the first web, is equal to a thickness of the second tab immediately adjacent the first web. The preceding subject matter of this paragraph characterizes example 14 of the present disclosure, wherein example 14 also includes the subject matter according to any one of examples 9-13, above.

A thickness of the first tab is constant. The preceding subject matter of this paragraph characterizes example 15 of the present disclosure, wherein example 15 also includes the subject matter according to any one of examples 9 and 11-14, above.

Additionally disclosed herein is a frame of a body of a mobile vehicle. The frame comprises a second web, elongate in a second direction and having a first side and a second side, opposite the first side. The frame also includes a first padup, protruding from the first side of the second web in a first direction, perpendicular to second direction, and extending along an entire length of the second web in the second direction. The frame further includes an intersection structure that comprises a cut-out, a first foot, a second foot, a second padup, a third padup and a fourth padup. The cut-out is formed in the second web and has a third side and a fourth side, opposite the third side. The third side is spaced apart from the fourth side in the second direction. The first foot is coupled to and extends, in a first direction perpendicular to the second direction, from the second web at the third side of the cut-out. The second foot is coupled to and extends, in the first direction, from the second web at the fourth side of the cut-out. The second foot is spaced apart from the first foot in the second direction. The second padup protrudes from the first padup, in the first direction, at a first localized portion of the second web contiguous with the cut-out. The third padup protrudes from the first side of the second web, in the first direction, at the first localized portion of the second web between the first padup and the first foot and between the first padup and the second foot. The fourth padup protrudes from the first side of the second web, in the first direction, at a second localized portion of the second web aligned with the cut-out in a third direction, perpendicular to the first direction and the second direction, and positioned adjacent the first padup in the third direction. The preceding subject matter of this paragraph characterizes example 16 of the present disclosure.

The cut-out has an asymmetrical shape along a plane parallel with the second direction and the third direction. The cut-out overlaps itself in the third direction. The preceding subject matter of this paragraph characterizes example 17 of the present disclosure, wherein example 17 also includes the subject matter according to example 16, above.

The second side of the second web does not have a padup. The preceding subject matter of this paragraph characterizes example 18 of the present disclosure, wherein example 18 also includes the subject matter according to any one of examples 16 and 17, above.

The frame comprises a plurality of intersection structures spaced apart along the second web in the second direction. The frame further comprises third flanges each extending from the second side of the second web, in the first direction, and each extending, in the second direction, from the first foot of one of the plurality of intersection structures to the second foot of an adjacent one of the plurality of intersection structures. The preceding subject matter of this paragraph characterizes example 19 of the present disclosure, wherein example 19 also includes the subject matter according to any one of examples 16-18, above.

The frame further comprises open spaces, on the first side of the second web, each extending, in the second direction, from the first foot of one of the plurality of intersection structures to the second foot of an adjacent one of the plurality of intersection structures. The preceding subject matter of this paragraph characterizes example 20 of the present disclosure, wherein example 20 also includes the subject matter according to any one of example 16-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
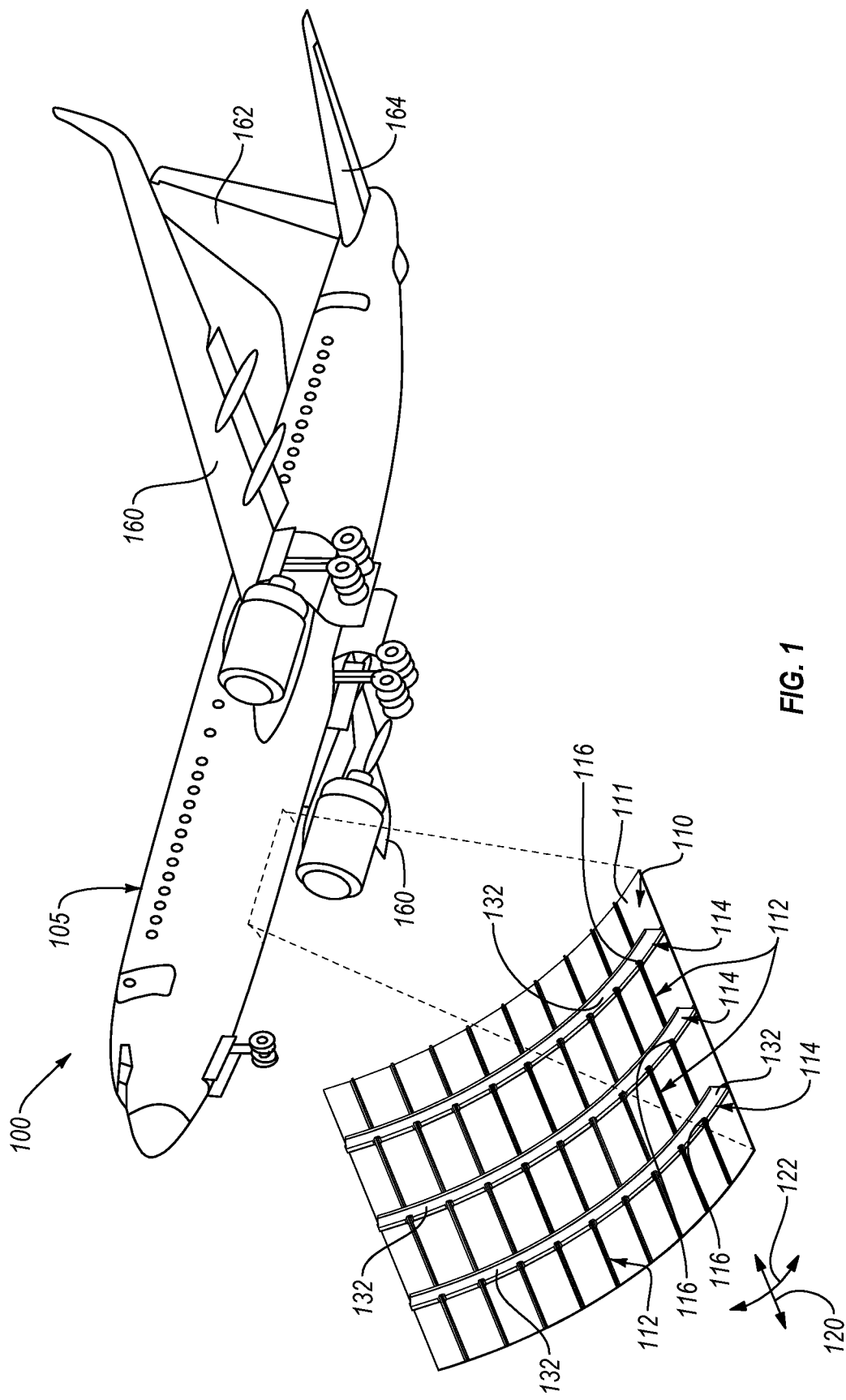
FIG. 1 is a perspective view of an aircraft and a detailed view of an interior of a body of the aircraft, according to one or more embodiments of the present disclosure.

Referring to FIG. 1, one embodiment of an aircraft 100 is shown. The aircraft 100 is an example of a mobile vehicle. In some implementations, the aircraft 100 is be replaced with any of various other mobile vehicles, such as a watercraft, rocket, automobile, etc. In some embodiments, the mobile vehicle is any vehicle that experiences relatively large fluctuations in atmospheric pressure during use. The aircraft 100 includes a body 105 (e.g., fuselage), a pair of wings 160 coupled to and extending from the body 105, a vertical stabilizer 162 coupled to and extending from the body 105, and a pair of horizontal stabilizers 164 coupled to and extending from the body 105 or the vertical stabilizer 162. The aircraft 100 includes features representative of a commercial passenger or military transport aircraft. However, in other embodiments, the aircraft 100 is any of various other types of commercial or non-commercial aircraft, such as personal aircraft, fighter jets, helicopters, spacecraft, and the like.

The body 105 of the aircraft 100 includes a skin 110 or fuselage barrel that has a hollow and elongate tubular construction. For example, the skin 110 extends lengthwise in a first direction 120, or longitudinal direction. In other words, the skin 110 is elongate in the first direction 120. A longitudinal axis, which defines a central axis of the body 105, extends parallel to the first direction 120. The cross-sectional shape of the skin 110 along a plane perpendicular to the first direction 120 is generally a circular or an annular ring. Unless otherwise noted, as used herein, a direction identified in the figures by dual directional arrows effectively includes both directions or opposite directions along the identified path. Accordingly, for example, the first direction 120 includes a fore-to-aft direction along the path identified with dual directional arrows and labeled 120 and an aft-to-fore direction along the same path.

The skin 110 of the body 105 is a single layer in some embodiments and includes multiple layers in other embodiments. For example, in some embodiments, the skin 110 includes multiple layers, such as outer layers and inner layers that collectively form a barrel. Because the barrel functions as a radially outer structure of the body 105, it is often referred to as a skin. In some implementations, the skin 110 is made from a fiber-reinforced polymer (e.g., carbon-fiber-reinforced polymer and glass-fiber-reinforced polymer), a metal, or a combination of a fiber-reinforced polymer and metal. As one example, the skin 110 is formed of multiple interconnected annular skin segments each formed from a continuous length of fiber that is spun, along with uncured resin or epoxy, into the shape of a skin segment and cured. Alternatively, in another example, the skin 110 includes multiple interconnected annular skin segments each formed by interconnecting multiple non-annular panels together.

Still referring to FIG. 1, the body 105 includes a plurality of stringers 112 circumferentially spaced apart from each other about an interior surface 111 of the skin 110. More specifically, the plurality of stringers 112 are spaced apart from each other in a second direction 122, or hoopwise direction, that is perpendicular to the first direction 120. The second direction 122 is a generally circular direction that follows the curvature of the interior surface 111 of the skin 110. Accordingly, the second direction 122 is tangential to the interior surface 111 of the skin 110 at every point circumferentially along the interior surface 111 of the skin 110. Moreover, the plurality of stringers 112 are fixed directly onto and extend along the interior surface 111 of the skin 110 in a direction parallel to the first direction 120. When fixed to the skin 110, the stringers 112 are elongate in the first direction 120. In some embodiments, multiple stringers 112 are arranged in an end-to-end manner to linearly extend an entire length of the body 105. Generally, the stringers 112 are fixed onto the interior surface 111 of the skin 110 and promote structural rigidity of the skin 110 and thus the body 105.

The stringers 112 can have any of various shapes. As will be described in more detail below, each stringer 112 has a first web and at least one flange that extends from a respective side of the web. The web is raised relative to the flanges and can have any of various shapes. The flanges are coupled directly to the interior surface 111 of the skin 110 via any of various coupling techniques, such as fastening with fasteners. In some implementations, the stringers 112 are made from a fiber-reinforced polymer. In other implementations, the stringers 112 are made from a metal.

The body 105 also includes a plurality of frames 114, or frame elements, longitudinally spaced apart from each other along an interior surface 111 of the skin 110. More specifically, the plurality of frames 114 are spaced apart from each other in the first direction 120. Moreover, some portions of each of the plurality of frames 114 are fixed directly onto the interior surface 111 of the skin 110, such that no stringers 112 are interposed between these portions of the frames 114 and the skin 110, and other portions of each of the plurality of frames 114 are fixed directly onto respective stringers 112, such that the stringers 112 are immediately interposed between these other portions of the frames 114 and the skin 110. The frames 114 extend along the interior surface 111 of the skin 110 in the second direction 122. Therefore, when fixed to the skin 110, the frames 114 are elongate in the second direction 122 and thus have a curvature complementing the curvature of the interior surface 111 of the skin 110. In some embodiments, multiple frames 114 are circumferentially aligned and arranged in an end-to-end manner to form a segmented annular frame that extends an entire inner circumference of the skin 110. In other embodiments, the body 105 includes one or more single continuous annular frames 114 that extends along an entirety of the circumference of the interior surface 111 of the skin 110. Generally, the frames 114 are fixed onto the interior surface 111 of the skin 110 and promote structural rigidity of the skin 110 and thus the body 105 by preventing ballooning of the body 105.

Each frame 114 includes a second web 132 and at least one cut-out 116 formed in the second web 132. Each cut-out 116 of a frame 114 is positioned and sized to allow a respective stringer 112 to pass therethrough when the frame 114 is fixed onto the skin 110. Accordingly, each frame 114 spans over or across at least one stringer 112 such that the stringers 112 are perpendicular to the frames 114. Moreover, each cut-out 116 of the frames 114 is enlarged relative to a respective stringer 112 to accommodate the placement of the frames 114, over or across the stringers 112 and onto the interior surface 111 of the skin 110, during assembly of the body 105 without the stringers 112 interfering with the placement of the frames 114.

Figure 2:
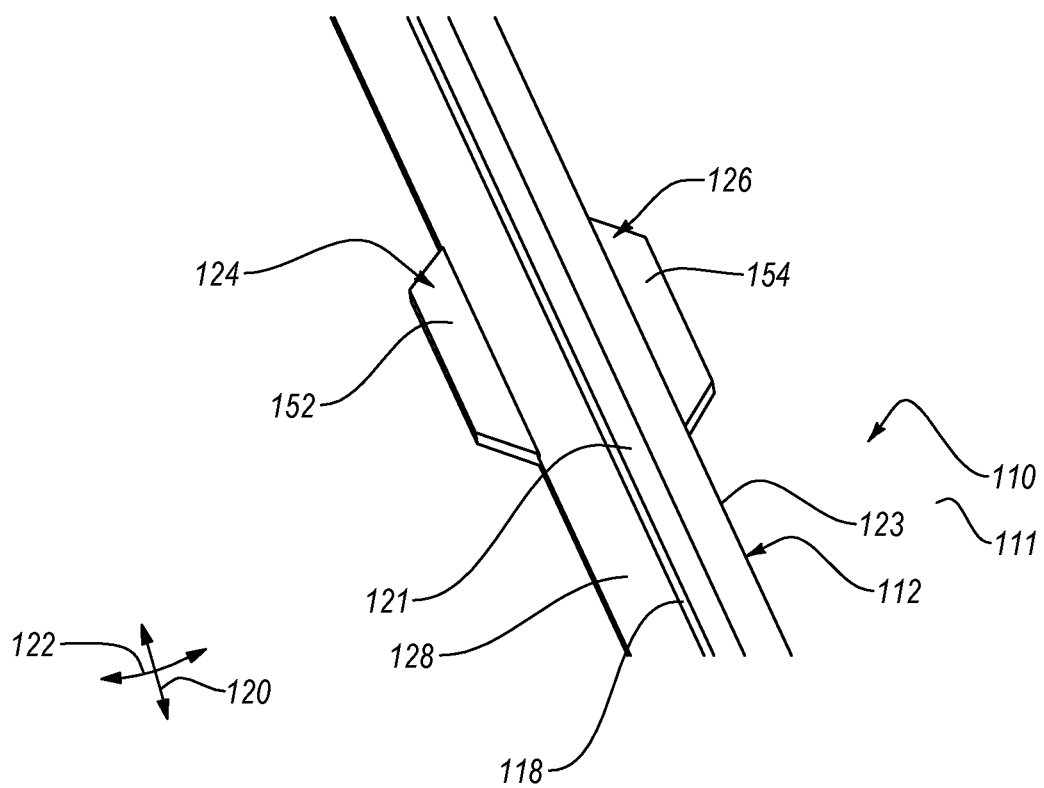
FIG. 2 is a perspective view of a stringer fixed onto a skin of a body of an aircraft, according to one or more embodiments of the present disclosure.
Figure 3:
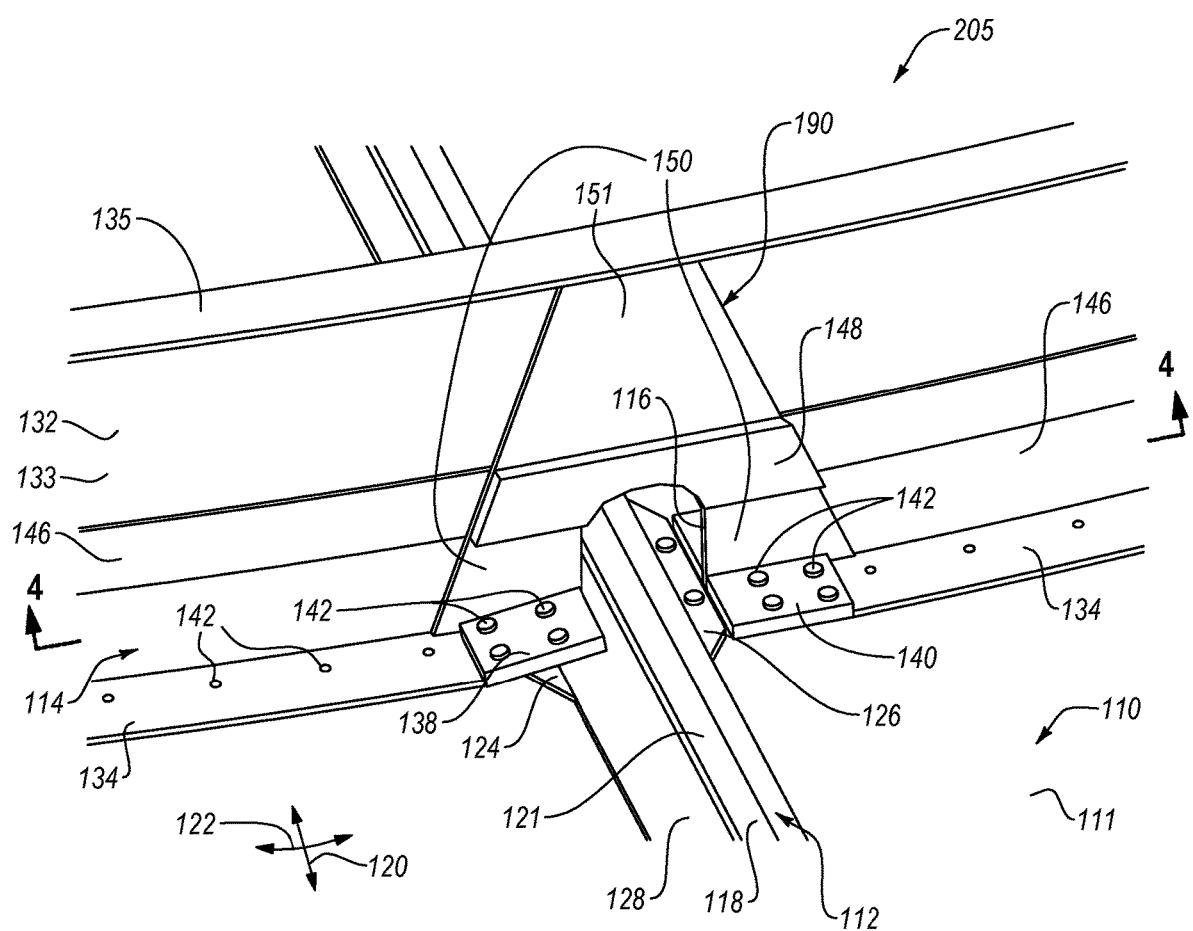
FIG. 3 is a perspective view of a frame of the body fixed onto the stringer and skin of the body of FIG. 2, according to one or more embodiments of the present disclosure.
Figure 4:
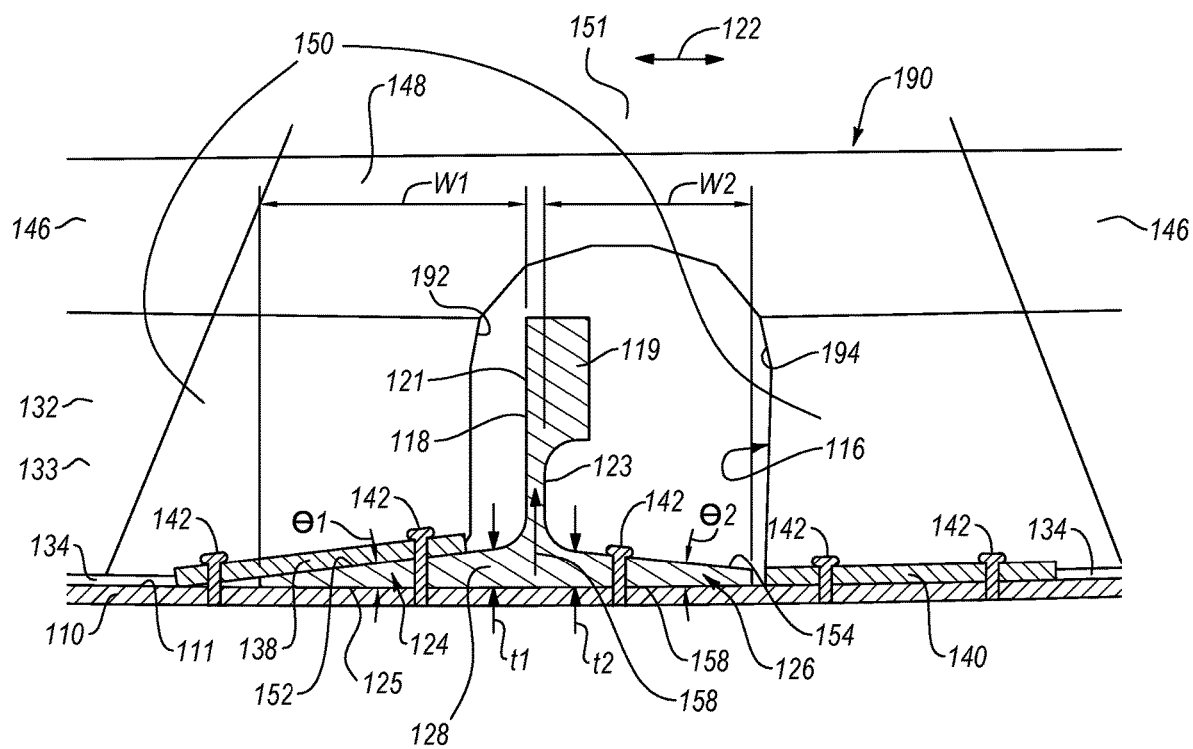
FIG. 4 is a cross-sectional side elevation view of the body of FIG. 3, taken along the line 4-4 of FIG. 3, according to one or more embodiments of the present disclosure.
Figure 5:
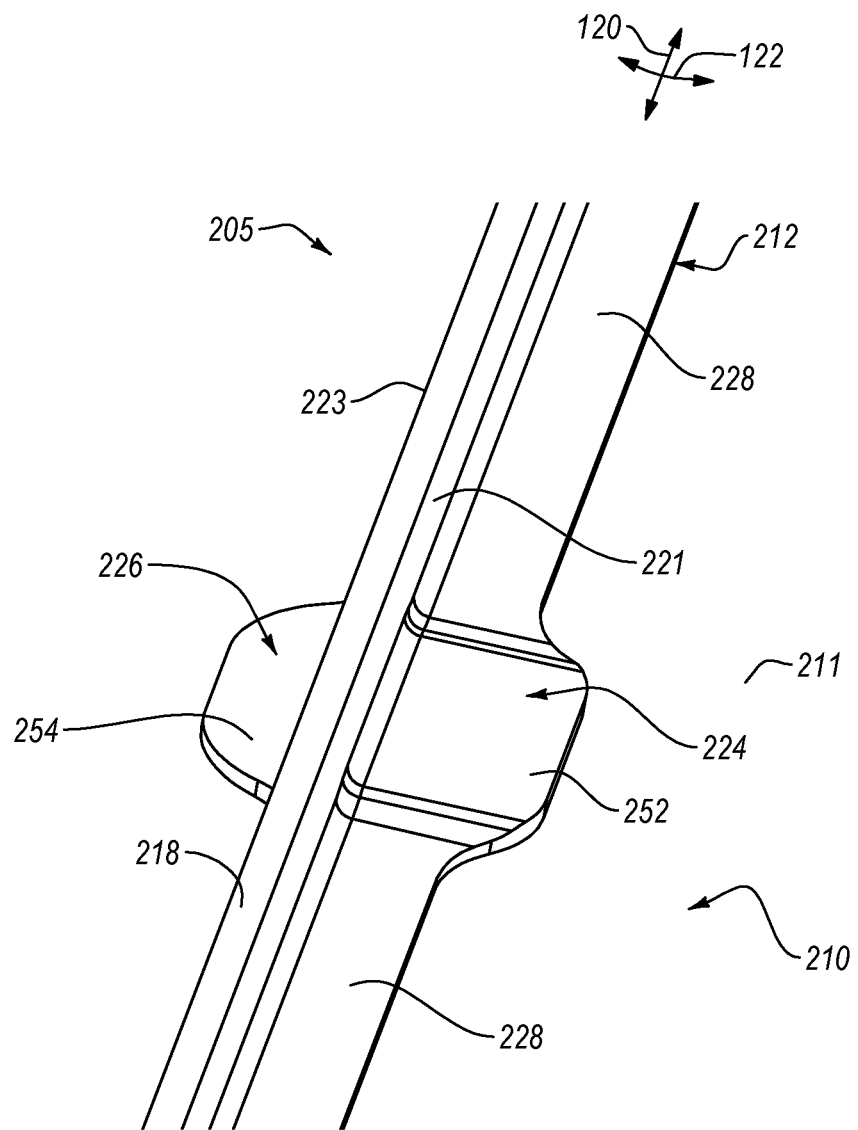
FIG. 5 is a perspective view of a stringer fixed onto a skin of a body of an aircraft, according to one or more embodiments of the present disclosure, according to one or more embodiments of the present disclosure.

Referring to FIGS. 2-4, one embodiment of a stringer-frame intersection of the body 105 is shown. Although a single stringer-frame intersection is shown, the body 105 includes multiple stringer-frame intersections in a manner analogous to the body 105 shown in FIG. 1. Specifically referring to FIG. 2, the stringer 112 of each stringer-frame intersection is fixed directly onto an interior surface 111 of the skin 110. Although not shown in FIG. 2, in some implementations, the stringer 112 is fixed onto the skin 110 via a plurality of fasteners, such as fasteners 142 (see, e.g., FIGS. 3 and 4). As presented above, the stringer 112 is elongate and extends parallel to the first direction 120 (e.g., the axial direction or longitudinal direction of the body 105).

The stringer 112 has a first web 118 (e.g., upright portion or raised portion) that extends lengthwise in the first direction 120 and heightwise in a third direction 158 (see, e.g., FIG. 4) that is perpendicular to the first direction 120. Additionally, the first web 118 is perpendicular to the second direction 122 where the stringer 112 is fixed onto the skin 110. In other words, the first web 118 extends substantially perpendicularly away from the portion of the interior surface 111 of the skin 110 onto which the stringer 112 is fixed. In one implementation, as shown, the first web 118 is a single plate-like element or panel. A chord with a greater thickness than the rest of the first web 118 is formed in the first web 118 to provide additional rigidity in some implementations. Although not shown, the first web 118 can have multiple panels forming a hat-like shape that defines an interior channel between the first web 118 and the interior surface 111 of the skin 110. Generally, the first web 118 includes a first side 121 and a second side 123 that is opposite the first side 121.

Additionally, the stringer 112 includes a first flange 128 extending away from a first side 121 of the first web 118 in the second direction 122 when the stringer 112 is fixed onto the skin 110. Generally, the first flange 128 is perpendicular or transverse relative to the first web 118. The first flange 128 extends along an entire length of the first web 118 in some implementations. Therefore, the first flange 128 is elongate in the first direction 120 when the stringer 112 is fixed onto the skin 110. The first flange 128 structurally reinforces or provides strength to the stringer 112 for resisting bending of the stringer 112. Additionally, the first flange 128 provides a platform or footing for mounting the stringer 112 onto the skin 110. For example, although not shown, multiple fasteners spaced apart along the first flange 128 extend through the first flange 128 and into the skin 110 to fix the stringer 112 onto the skin 110.

At each stringer-frame intersection along each stringer 112, a first tab 124, or first ear, extends from the first flange 128 in the second direction 122 and a second tab 126, or second ear, extends from a second side 123 of the first web 118 in the second direction 122, but opposite to the first flange 128. Accordingly, the first tab 124 and the second tab 126 are substantially perpendicular to the first web 118. Moreover, the first tabs 124 of each stringer 112 are spaced apart from each other along a length of the stringer 112 and the second tabs 126 are spaced apart from each other along the length of the stringer 112.

Referring to FIG. 4, in some embodiments, each second tab 126 is tapered in a direction away from the first tab 124, and thus away from first web 118. In other words, a second thickness t2 of the second tab 126 decreases as the second tab 126 extends away from the second side 123 of the first web 118. The taper of the second tab 126 enables a uniform bending of the stringer 112 and underlying skin 110 at the respective stringer-frame intersection, and helps to suppress shear buckling arrestment of the skin 110 and facilitates the distribution of loads from the stringer 112 to both sides of the frame 114. In other words, the taper of the second tab 126 promotes a relationship between the bending characteristics of the skin 110, the stringer 112, and the frame 114 such that there is a more uniform load distribution between the skin 110, the stringer 112, and the frame 114, which reduces the stress in the skin 110. However, in other embodiments, each second tab 126 is not tapered. Accordingly, depending on the shear buckling arrestment of the skin 110 and load distribution needs of a particular body of an aircraft, the second angle θ2 of the taper of the second tab 126 can be at any of various angles relative to a skin intersection surface 125 of the stringer 112. In some implementations, the second tab 126 tapers at a second angle θ2 between about 0-degrees and about 10-degrees. In yet certain implementations, the second tab 126 tapers at a second angle θ2 between about 0-degrees and about 7-degrees. In one specific implementation, for example, the second tab 126 tapers at a second angle θ2 between about 5-degrees and about 7-degrees. When fixed onto the skin 110, the skin intersection surface 125 is substantially flush with the interior surface 111 of the skin 110. Moreover, because the interior surface 111 of the skin 110 is curved in the second direction 122, the skin intersection surface 125 of the stringer 112 also is curved to complement the curvature of the interior surface 111 of the skin 110.

According to some embodiments, as shown in FIG. 4, each first tab 124 also is tapered in a direction away from the second tab 126, and thus away from the first web 118 and the first flange 128. In other words, a first thickness t1 of the first tab 124 decreases as the second tab 126 extends away from the first side 121 of the first web 118. Like the taper of the second tab 126, the taper of the first tab 124 helps to promote a more uniform load distribution between the skin 110, the stringer 112, and the frame 114. However, in other embodiments, each first tab 124 is not tapered. A first angle θ1 of the taper of the first tab 124 can be at any of various angles relative to a skin intersection surface 125 of the stringer 112. In some implementations, the first tab 124 tapers at a first angle θ1 between about 0-degrees and about 10-degrees. In yet certain implementations, the first tab 124 tapers at a first angle θ1 between about 0-degrees and about 7-degrees. In one specific implementation, for example, the first tab 124 tapers at a first angle θ1 between about 5-degrees and about 7-degrees.

In embodiments where the first tab 124 is tapered, the portion of the first flange 128 contiguous with the first tab 124 is also tapered to complement the taper of the first tab 124 in certain implementations. In other words, as shown in FIG. 4, from the first side 121 of the first web 118 to the outer extent (e.g., distal edge) of the first tab 124, the first flange 128 and the first tab 124 continuously taper, at the same angle in some implementations. Although an entirety of the first tab 124 and the first flange 128 contiguous with the first tab 124 is tapered in the illustrated embodiments, in other embodiments, only a portion of the first tab 124 and/or first flange 128 is tapered.

According to some embodiments, although not shown, the stringer 112 also includes a second flange extending away from the second side 123 of the first web 118 in the second direction 122 when the stringer 112 is fixed onto the skin 110. Generally, the second flange opposes the first flange 128 and is perpendicular or transverse relative to the first web 118. The second flange can extend along an entire length of the first web 118 in some implementations. Therefore, the second flange is elongate in the first direction 120 when the stringer 112 is fixed onto the skin 110. The second flange, like the first flange 128, structurally reinforces or provides strength to the stringer 112 for resisting bending of the stringer 112. Additionally, the second flange can provide a platform or footing for mounting the stringer 112 onto the skin 110. For example, multiple fasteners spaced apart along the second flange extend through the second flange and into the skin 110 to fix the stringer 112 onto the skin 110.

In embodiments where the stringer 112 includes a second flange, the second tab 126 extends from the second flange in the second direction 122 in the same manner, but opposite direction, as the first tab 124 from the first flange 128. In such embodiments, the portion of the second flange contiguous with the second tab 126 is also tapered to complement the taper of the second tab 126 in some implementations. In other words, from the second side 123 of the first web 118 to the outer extent (e.g., distal edge) of the second tab 126, the second flange and the second tab 126 continuously taper, at the same angle in some implementations. Although an entirety of the second tab 126 and the second flange contiguous with the second tab 126 can be tapered, in other embodiments, only a portion of the second tab 126 and/or second flange is tapered.

Referring to FIG. 4, a first combined width W1 is defined as the width of the first flange 128 plus the width of the first tab 124. A second width W2 is defined as the width of the second tab 126 (or combined width of the second flange and second tab 126 when the stringer 112 includes a second flange). Generally, the width of the first flange 128 is the distance, in the second direction 122, between the first side 121 of the first web 118 and an outer edge of the first flange 128 and the width of the first tab 124 is the distance, in the second direction 122, between the outer edge of the first flange 128 and an outer edge of the first tab 124. Similarly, the width of the second tab 126 is the distance, in the second direction 122, between the outer edge of the second tab 126 and the second side 123 of the first web 118. Accordingly, the first combined width W1 is the distance, in the second direction 122, between the first side 121 of the first web 118 and the outer extent of the first tab 124, and the second width W2 is the distance, in the second direction, between the second side 123 of the first web 118 and the outer extent of the second tab 126. As shown in FIG. 4, in some embodiments, the first combined width W1 is different than the second width W2. More specifically, according to certain implementations, the first combined width W1 is greater than the second width W2, which accommodates fastener constraints associated with the first flange 128 and first tab 124 but utilizes the relatively fewer fastener constraints associated with the second tab 126 by making the second tab 126 smaller and lighter. However, in other embodiments, the first combined width W1 is the same as or less than the second width W2.

The first thickness t1 of the first flange 128 immediately adjacent the first side 121 of the first web 118 and the second thickness t2 of the second tab 126 immediately adjacent the second side 123 of the first web 118 are selected to promote control of skin and stringer stresses at the intersection of the first web 118 and the first flange 128 and the intersection of the first web 118 and the second tab 126. In some implementations, the first thickness t1 of the first flange 128 immediately adjacent the first side 121 of the first web 118 and the second thickness t2 of the second tab 126 immediately adjacent the second side 123 of the first web 118 are the same. However, in other implementations, the first thickness t1 of the first flange 128 immediately adjacent the first side 121 of the first web 118 and the second thickness t2 of the second tab 126 immediately adjacent the second side 123 of the first web 118 are different.

Moreover, to promote a reduction in the weight of the stringer 112, while maintaining the strength of the stringer 112, in some implementations, the thickness of the first flange 128 (and/or a second flange in certain implementations) varies along the length of the stringer 112. For example, the first thickness t1 of the first flange 128 adjacent the first tab 124, in the second direction 122, is greater than the first thickness t1 of the first flange 128 adjacent the first tab 124, in the first direction 120. In other words, in certain implementations, the thickness of a flange along portions of the flange between the tabs (e.g., non-contiguous with the tabs) is thinner than portions of the flange contiguous with the tabs. The reduced materials associated with the thinner portions of the flange results in a reduced weight of the stringer 112.

Referring to FIGS. 3 and 4, with the stringer 112 positioned or fixed onto the interior surface 111 of the skin 110, the frame 114 of each stringer-frame intersection is positioned over the stringer 112, fixed onto a portion of the stringer 112, and fixed onto the interior surface 111 of the skin 110. In some implementations, the frame 114 is fixed onto the skin 110, at least partially, via a plurality of fasteners, such as fasteners 142, that extend through a third flange 134 of the frame 114 and into the skin 110. As presented above, the frame 114 is elongate and extends parallel to the second direction 122 (e.g., the hoopwise direction or circumferential direction of the body 105).

The frame 114 has a second web 132 (e.g., upright portion or raised portion) that extends lengthwise in the second direction 122 and heightwise in the third direction 158. Like the first web 132 of the stringer 112, the second web 132 of the frame 114 extends substantially perpendicularly away from the portion of the interior surface 111 of the skin 110 onto which the frame 114 is fixed. In one implementation, as shown, the second web 132 is a single plate-like element or panel. According to some implementations, one or more chords with a greater thickness than the rest of the second web 132 is formed in the second web 132 at particular locations of the second web 132 to provide additional rigidity at those locations, as will be explained in more detail below.

As mentioned above, the frame 114 includes a third flange 134 extending away from each of opposite sides (e.g., first side 133 and a second opposite side) of the second web 132 in the first direction 120 when the frame 114 is fixed onto the skin 110. Generally, the third flanges 134 are perpendicular or transverse relative to the second web 132. The third flanges 134 extend along a length of the second web 132 between first and second footings 138, 140 of adjacent intersection structures 190 of the frame 114. Therefore, the third flanges 134 are elongate in the second direction 122 when the frame 114 is fixed onto the skin 110. The third flanges 134 structurally reinforce or provide strength to the frame 114 for resisting bending of the frame 114. To add additional structural reinforcement, the frame 114 may also include cap flanges 135 coupled to the second web 132 and spaced apart from the third flanges 134 by the second web 132. Additionally, the third flanges 134 provide a platform or footing for mounting the frame 114 onto the skin 110. For example, multiple fasteners 142 are shown spaced apart along the third flange 134 on one side of the second web 132 and extending through the third flange 134 into the skin 110 to at least partially fix the frame 114 onto the skin 110.

The frame 114 includes an intersection structure 190 at each stringer-frame intersection. Accordingly, although one intersection structure 190 is shown, the frame 114 includes multiple intersection structures 190 spaced apart along a length of the frame 114. The intersection structure 190 includes a cut-out 116, a first foot 138, and a second foot 140.

The cut-out 116 of the intersection structure 190 is formed in the second web 132. Furthermore, the cut-out 116 has essentially two opposite sides, for example, a third side 192 and a fourth side 194 opposite the third side 192. The third side 192 is spaced apart from the fourth side 194 in the second direction 122. The cut-out 116 defines a shape having a cross-section, along a plane parallel to the second web 132, that is significantly larger than the cross-section of the first web 118 of the stringer 112. For example, the cut-out 116 has a length greater than a width of the first web 118 and a height greater than a height of the first web 118. Generally, the height and length of the cut-outs 116 are large enough to receive respective first webs 118 of multiple spaced-apart stringers 112 on the skin 110 as the frame 114 is concurrently positioned over the first webs 118 of multiple spaced-apart stringers 112 and fixed onto the skin 110.

In some implementations, the cut-out 116 has a generally mouse-hole shape or railway tunnel shape as shown in FIGS. 3 and 4. That is, the cut-out 116 includes two opposing parallel sides and an arcuate top side joining the two opposing sides. Accordingly, in some implementations, the shape of the cut-out 116 is symmetrical. In other implementations, the cut-out 116 can have other symmetrical and non-symmetrical shapes.

The first foot 138 of the intersection structure 190 is coupled to the second web 132 of the frame 114 at the third side 192 of the cut-out 116. In contrast, the second foot 140 is coupled to the second web 132 of the frame 114 at the fourth side 194 of the cut-out 116. The first foot 138 and the second foot 140 extend from the second web 132 in the first direction 120. Moreover, the first foot 138 is spaced apart from the second foot 140 in the second direction 122. In some implementations, the first foot 138 is an extension of the third flanges 134 at the third side 192 of the cut-out 116 and the second foot 140 is an extension of the third flanges 134 at the fourth side 194 of the cut-out 116. Alternatively, the first foot 138 and the second foot 140 are separately formed and coupled to the second web 132 in certain implementations. Generally, the first foot 138 and the second foot 140 each have a thickness that is greater than the thickness of the third flanges 134. Accordingly, the first foot 138 and the second foot 140 are stronger or more robust than the third flanges 134.

The first foot 138 is angled relative to the interior surface 111 of the skin 110, when the frame 114 is fixed onto the skin 110, to complement the taper of the first tab 124, as well as the taper of the first flange 128 in such implementations. The angle of the first foot 138 allows the first foot 138 to sit flush against a tapered upper surface 152 of the first tab 124. Accordingly, the first foot 138 is fixed directly onto the first tab 124 of the stringer 112 such that the first tab 124 of the stringer 112 is immediately interposed between the first foot 138 of the frame 114 and the skin 110.

The second foot 140 is not angled relative to the interior surface 111 of the skin 110, when the frame 114 is fixed onto the skin 110, to allow the second foot 140 to sit flush against the interior surface 111 of the skin 110. Accordingly, the second foot 138 is fixed directly onto the interior surface 111 of the skin 110, such that no portion of the frame 114 is fixed directly onto the second tab 126 of the stringer 112. Because no portion of the frame 114 is fixed directly onto the second tab 126 of the stringer 112, the upper surface 154 of the second tab 126 is exposed or visually accessible. In other words, the upper surface 154 of the second tab 126 is open to the cut-out 116 such that an open space, unoccupied by another structure, is defined between the upper surface 154 of the second tab 126 and the cut-out 116. The visual accessibility of the upper surface 154 of the second tab 126 allows personnel to visually inspect the second tab 126 for abnormalities, such as cracks, that would not otherwise be visually accessible if the frame 114 were fixed directly onto the second tab 126. The spacing of the first foot 138 relative to the second foot 140 is such that a maximum distance, in the second direction 122, between the first tab 124 of the stringer 112 and the second tab 126 of the stringer is greater than a maximum distance, in the second direction 122, between the first foot 138 and the second foot 140.

As defined herein, one structural member is considered to be fixed directly onto another structural member even if other non-structural layers, such as sealants, adhesives, paint, etc., are positioned between the two structural members, as long as a third structural member is not between the one structural member and the other structural member. Similarly, as defined herein, one structural member is immediately interposed between two other structural members even if other non-structural layers are positioned between the one structural member and the two other structural members, as long as no fourth structural member is positioned between the two other structural members. As further defined herein, a structural member is a member that alone is capable of bearing a substantial load and resisting deformation under that load, or a structural member that carries a load during normal operation of a mobile vehicle of which the structure member forms a part.

Referring still to FIGS. 3 and 4, the first foot 138 and the second foot 140 are fixed to the skin 110 via one or more fasteners 142. In the case of the first foot 138, at least some fasteners 142 extend through the first foot 138, the first tab 124, and the skin 110. In some implementations, at least some fasteners 142 extend through only the first foot 138 and the skin 110. Similarly, in some implementations, at least some fasteners 142 extend through only the second foot 140 and the skin 110. The fasteners 142 can be any of various fasteners, such as screws, rivets, and pins (e.g., HI-LOK™ pins).

The frame 114 also includes a first padup 146, protruding from a localized portion of the first side 133 of the second web 132 in the first direction 120. The first padup 146 extends along an entire length of the second web 132 in some implementations. The first padup 146 effectively increases a thickness of the second web 132 at the localized portion of the first side 133. The added thickness of the first padup 146 strengthens the second web 132 of the frame 114 to help reduce the propagation of cracks in the skin 110.

The intersection structure 190 includes a second padup 148, protruding from the first padup 146 in the first direction 120 at a first localized portion of the second web 132 that is contiguous with the cut-out 116. The second padup 148 spans the cut-out 116 and has a length in the second direction 122 that is greater than a maximum length of the cut-out 116, but only extends along a portion of the second web 132 that is local to the intersection structure 190. Moreover, the second padup 148 also effectively increases the thickness of the second web 132 by adding thickness to the combined thicknesses of the second web 132 and the first padup 146.

Additionally, the intersection structure 190 includes a third padup 150, protruding from a localized portion of the first side 133 of the second web 132 in the first direction 120. The localized portion is a portion of the first side 133 of the second web 132 between the first foot 138 and the first padup 146 and between the second foot 140 and the first padup 146. Accordingly, the third padup 150 is contiguous with the cut-out 116 and is divided into two spaced-apart portions by the cut-out 116. The third padup 150 effectively increases the thickness of the second web 132 at two portions of the first side 133 abutting the first foot 138 and the second foot 140 on both sides of the cut-out 116.

The intersection structure 190 also includes a fourth padup 151, protruding from a localized portion of the first side 133 of the second web 132 in the first direction 120. The localized portion is aligned with the cut-out 116 in the third direction 158 and is positioned adjacent the first padup 146 in the third direction 158. The fourth padup 151 is non-contiguous with the cut-out 116 as the first padup 146 is positioned between the cut-out 116 and the fourth padup 151. As further defined, the fourth padup 151 is positioned between the first padup 146 and the cap flange 135 of the frame 114.

As shown in FIG. 3, in one implementation, the second padup 148, third padup 150, and fourth padup 151 collectively define a substantially triangular shape encompassing or surrounding the cut-out 116. In this manner, high stresses and low fatigue life that could be associated with an enlarged cut-out 116 are mitigated by the increased effective thickness of the second web 132 of the frame 114 surrounding the cut-out 116. The second padup 148, the third padup 150, and the fourth padup 151 also increase the local stiffness of the frame 114 at the connection to the stringer 112. This local stiffness increase improves the structural stability of the frame 114.

Referring to FIGS. 5-10, another embodiment of a body 205 of a mobile vehicle is shown. The body 205 of FIGS. 5-10 is analogous to the body 105 of FIGS. 2-4, with like numbers referring to like features. More specifically, features of the body 205 that are analogous with features of the body 105 have the same number, but in the 200-series format rather than the 100-series format of the body 105. Therefore, unless otherwise noted, the description, including the structure, function, and advantages, of the features of the body 105 presented above are applicable to the analogous features of the body 205.

The second tab 226 of the stringer 212 is tapered in a manner similar to the second tab 126. However, the first tab 224 of the stringer 212 is not tapered. Rather, a thickness t1 of the first tab 224 of the stringer 212 is constant in the second direction 122 away from the first web 218. Accordingly, the first foot 238 of the frame 214 is not angled relative to the interior surface 211 of the skin 210. Rather, the first foot 238 includes a groove 282 that defines a gap between the first foot 238 and the skin 210. The first tab 224 of the stringer 212 is positioned within the gap and the groove 282 of the first foot 238 sits flush against the upper surface 252 of the first tab 224. A first portion of the first foot 238 defines the groove 282 and a second portion of the first foot 238 sits flush against the interior surface 211 of the skin 210. Accordingly, the first foot 238 of the frame 214 is configured such that some of the first foot 238 sits flush against the first tab 224 of the stringer and some of the first foot 238 sits flush against the interior surface 211 of the skin 210.

Figure 6:
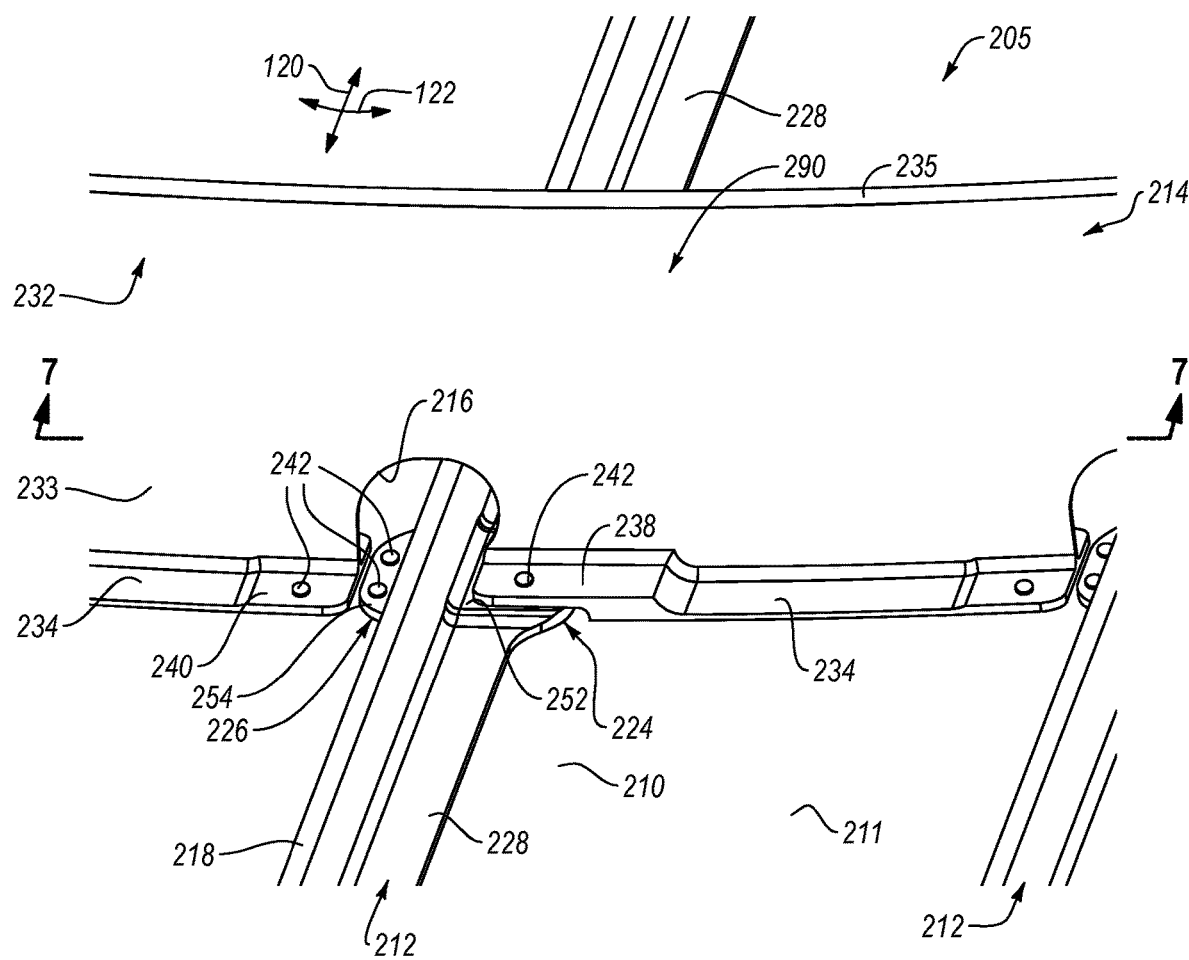
FIG. 6 is a perspective view of one surface a frame of the body fixed onto the stringer and skin of the body of FIG. 5, according to one or more embodiments of the present disclosure.
Figure 7:
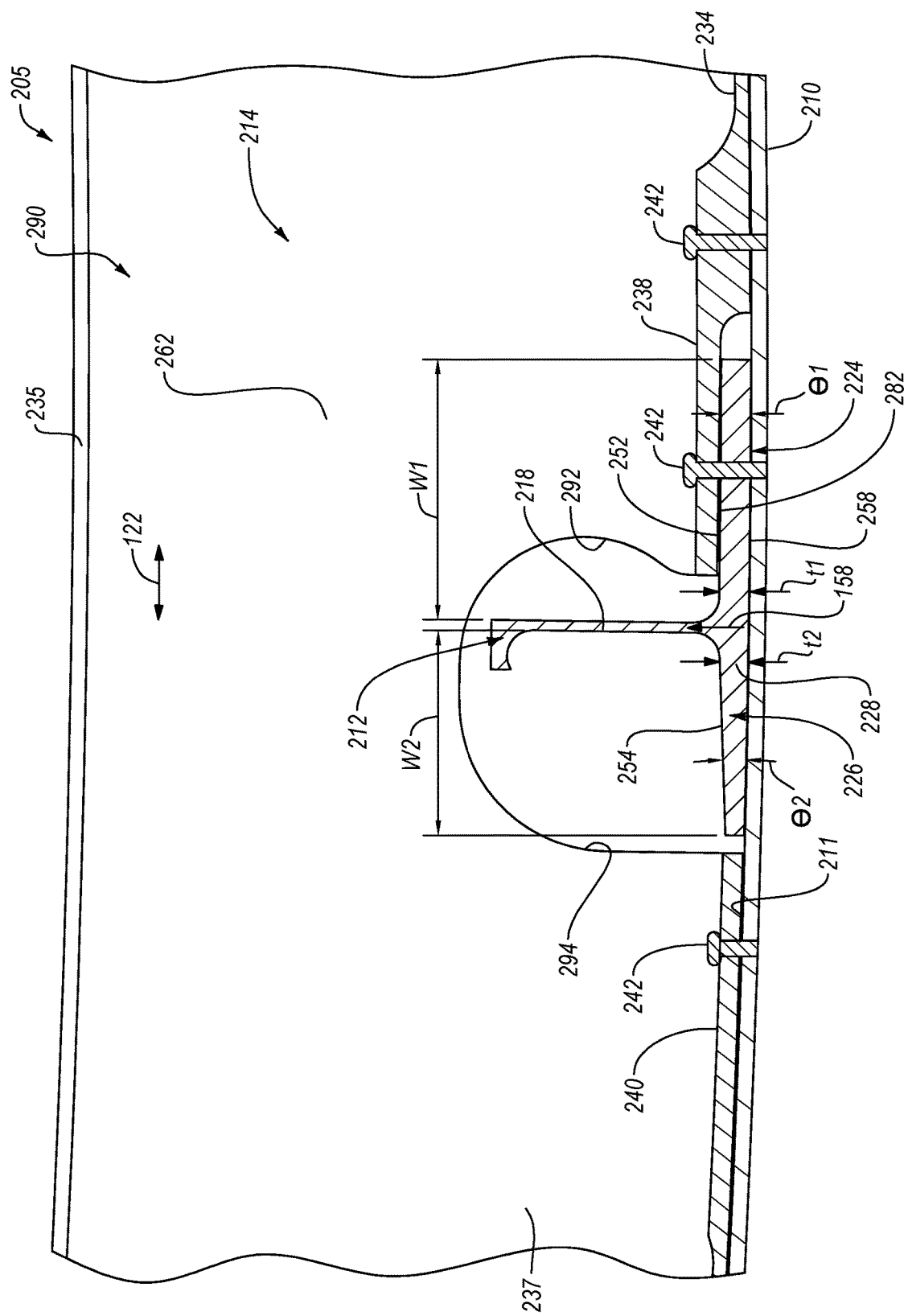
FIG. 7 is a cross-sectional side elevation view of the body of FIG. 6, taken along the line 7-7 of FIG. 7, according to one or more embodiments of the present disclosure.
Figure 8:
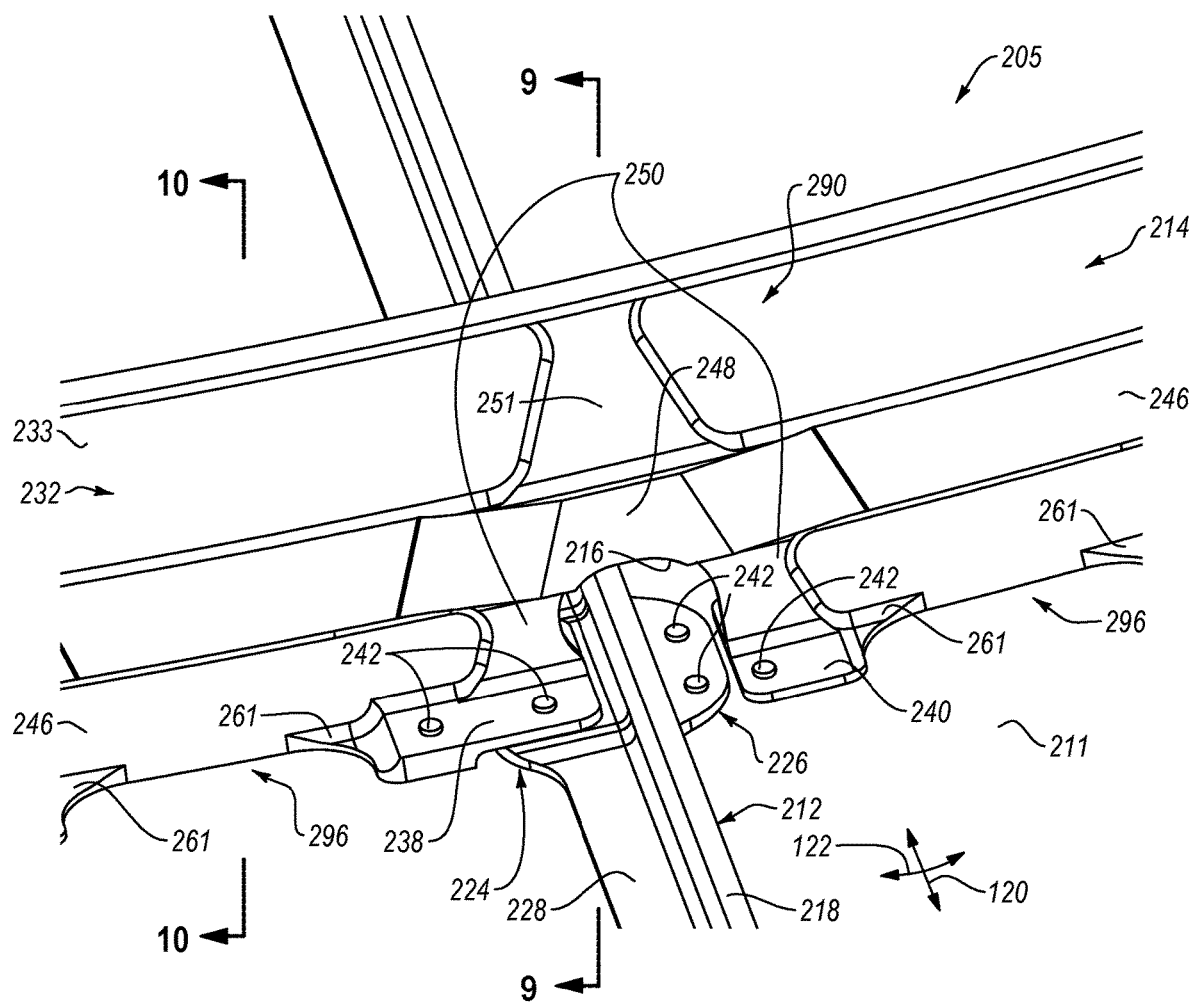
FIG. 8 is a perspective view of an opposite surface the frame of the body fixed onto the stringer and skin of the body of FIG. 5, according to one or more embodiments of the present disclosure.

Referring to FIGS. 6-8, the cut-out 216 of the frame 214 has an asymmetrical shape along a plane parallel to the second web 232 of the frame 214. Generally, the shape of the cut-out 216 is oblong in the second direction 122. More specifically, the shape of the cut-out 216 is oblong in a direction extending from the first side 294 of the cut-out 216 to the second side 292 of the cut-out 216. In other words, a first portion of the cut-out 216 proximate the first foot 238 overlaps itself in the third direction 158. Put another way, the first portion of the cut-out 216 includes at least one inflection point where a curvature of the cut-out 216 changes from concave to convex. In contrast, a second portion of the cut-out 216 proximate the second foot 240 does not overlap itself or does not have an inflection point. According to some implementations, the first portion of the cut-out 216 is considered to have a semi-bulb shape and the second portion of the cut-out 216 is considered to have a semi-U shape. The first web 218 of the stringer 212 is closer to the first portion of the cut-out 216 than the second portion of the cut-out 216.

Figure 9:
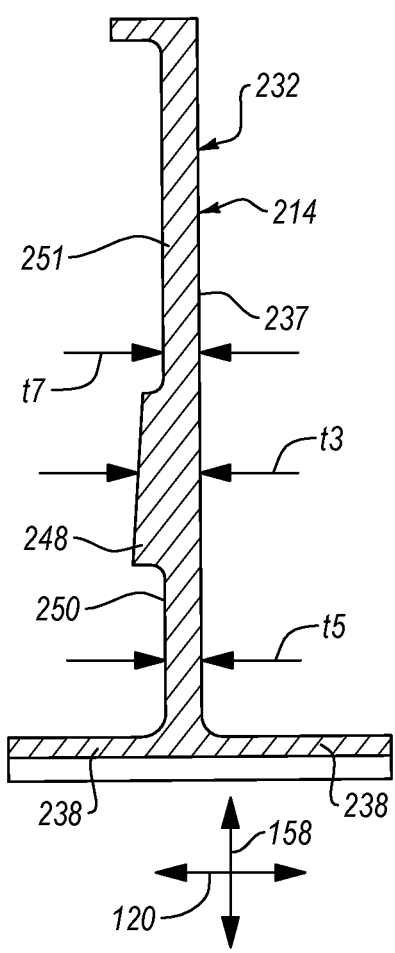
FIG. 9 is a cross-sectional side elevation view of the frame of FIG. 8, taken along the line 9-9 of FIG. 8, according to one or more embodiments of the present disclosure.
Figure 10:
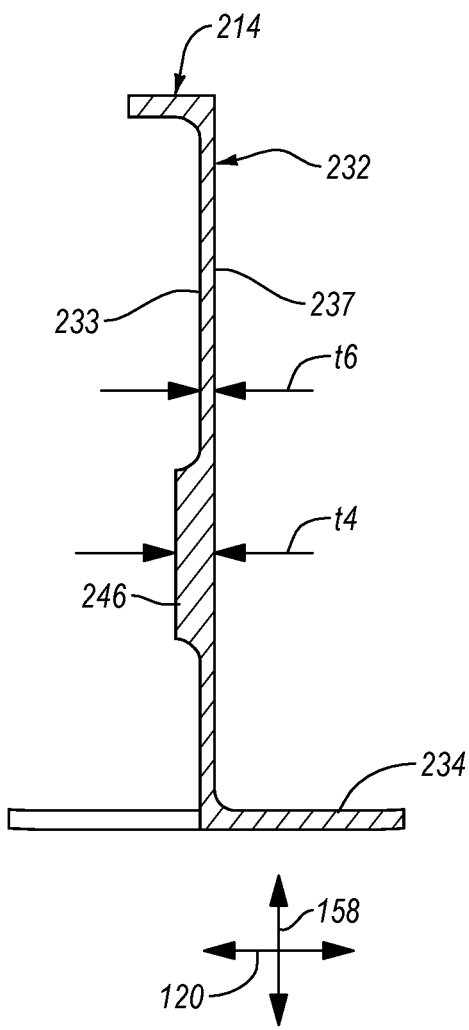
FIG. 10 is a cross-sectional side elevation view of the frame of FIG. 8, taken along the line 10-10 of FIG. 8, according to one or more embodiments of the present disclosure.

Referring to FIG. 8, the first side 233 of the second web 232 of the frame 214 includes the first padup 246, the second padup 248, the third padup 250, and the fourth padup 251, which are similar to the first padup 146, the second padup 148, the third padup 150, and the fourth padup 151. However, the second padup 248 tapers more gradually in the second direction 122 than the second padup 148 and thus spans more of the first padup 246 in the second direction 122 than the second padup 148. Referring to FIGS. 9 and 10, the padups effectively increase the thickness t6 of the second web 232 to an effective thickness greater than the thickness t6 of the second web 232. For example, the first padup 246 increases the thickness t6 of the second web 232 to an effective thickness t4, the second padup 248 increases the thickness t6 of the second web 232 to an effective thickness t3, the third padup 250 increases the thickness t6 of the second web 232 to an effective thickness t5, and the fourth padup 251 increases the thickness t6 of the second web 232 to an effective thickness t7. In some implementations, the effective thickness t3 is greater than each of the effective thicknesses t4, t5, t7. According to certain implementations, each of the effective thicknesses t5, t7 is equal to the effective thickness t4. However, each of the effective thicknesses t5, t7 can be the same as or greater than the effective thickness t4. In some implementations, the effective thickness t5 is equal to the effective thickness t7, but in other implementations, the effective thickness t5 is different (e.g., more than or less than) the effective thickness t7.

Referring to FIGS. 6 and 7, a second side 237 of the second web 232 of the frame 214 does not include a padup. More specifically, the second side 237 of the second web 232 does not include protrusions extending from the second side 237. Rather, the second side 237 of the second web 232 is substantially flat.

As shown in FIGS. 6, 7, and 10, the frame 214 includes a third flange 234 extending from just the second side 237 of the second web 232 in the first direction 120 when the frame 214 is fixed onto the skin 210. Accordingly, instead of having a third flange extend from both the first side 233 and the second side 237 of the second web 232, the frame 214 has one third flange 234 extending from only the second side 237 of the second web 232. Therefore, the frame 214 does not include a third flange 234 extending from the first side 233. Rather, as shown in FIGS. 8 and 10, in place of a third flange 234, there are open spaces 296 or gaps between the first and second feet 238, 240 of adjacent intersection structures 290 of the frame 214. In other words, along the first side 233 of the frame 214 there are open spaces 296 each extending in the second direction from the first foot 238 of one of a plurality of intersection structures 290 to the second foot 240 of an adjacent one of the plurality of intersection structures 290.

In some implementations, transition tabs 261 may be coupled to each of the first foot 238 and the second foot 240. Each transition tab 261 provides a gradual transition from a respective one of the first foot 238 and the second foot 240 of a intersection structure 290 to the first side 233 of the second web 232. Moreover, each transition tab 261 is thinner than the first foot 238 or the second foot 240 to which the transition tab 261 is coupled. In such implementations, the open spaces 296 are defined between the transition tabs 261 coupled to the first and second feet 238, 240 of adjacent intersection structures 290 of the frame 214

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A body of a mobile vehicle, the body comprising:
skin;
a stringer, elongated in a first direction and comprising a first tab and a second tab, opposite the first tab, wherein the first tab is fixed directly onto the skin and the second tab is fixed directly onto the skin, wherein:
the stringer further comprises a web, having a first side and a second side, opposite the first side, the web extending lengthwise along the stringer in the first direction;
a flange protruding from the first side of the web and extending lengthwise along the stringer in the first direction;
the first tab is coupled to and protrudes from the flange and extends lengthwise in the first direction along only a portion of the flange;

the second tab is coupled to and protrudes directly from the second side of the web and extends lengthwise in the first direction along only a portion of the web; and the first tab protrudes from the flange in a second direction, perpendicular to the first direction, and the second tab protrudes directly from the second side of the web in a tapering direction opposite the second direction;

the web is upright relative to the first tab and the second tab; and a frame, comprising a cut-out, a first foot, and a second foot, spaced apart from the first foot by the cut-out, wherein:

the first foot is fixed directly onto the first tab of the stringer, such that the first tab of the stringer is immediately interposed between the first foot of the frame and the skin;

the second foot is fixed directly onto the skin, such that no portion of the frame is fixed directly onto the second tab of the stringer; and the second tab of the stringer continuously tapers, in the tapering direction, from the web of the stringer to an end of the second tab such that a thickness of the second tab continuously decreases from the web to the end of the second tab in the tapering direction.

2. The body according to claim 1, wherein the first tab of the stringer tapers in the second direction away from the second tab of the stringer such that a thickness of the first tab decreases in the second direction away from the second tab of the stringer.

3. The body according to claim 2, wherein:
the first foot of the frame is angled at a first angle relative to the second foot of the frame; and
the first angle complements the taper of the first tab.

4. The body according to claim 1, wherein:
the frame is elongated in the second direction and the tapering direction and spans the stringer such that the stringer is interposed between the frame and the skin;
the frame further comprises a second web, the cut-out being formed in the second web;
the web of the stringer passes through the cut-out of the frame;
the first foot of the frame is coupled to and extends from the second web at a first side of the cut-out; and
the second foot of the frame is coupled to and extends from the second web at a second side of the cut-out, spaced apart from the first side of the cut-out in a direction parallel to the second direction.

5. The body according to claim 4, wherein a first maximum distance from an extreme end the first tab of the stringer to an extreme end of the second tab of the stringer in the direction parallel to the second direction is greater than a width of the cut-out at the first foot of the frame and the second foot of the frame.

6. The body according to claim 4, wherein:
an entirety of the cut-out is divided into a first portion and a second portion;
the first portion of the cut-out has a semi-bulb shape along a first plane parallel to the second direction and the tapering direction;
the second portion of the cut-out has a semi-U shape along the first plane; and
the web of the stringer is closer to the first portion than the second portion.

7. The body according to claim 1, wherein:
a first portion of the first foot of the frame is flush against the skin and comprises a groove that defines a gap between a second portion of the first foot and the skin;
the first tab of the stringer is positioned within the gap; and
an entirety of the second foot of the frame is flush against the skin.

8. The body according to claim 1, wherein:
the web of the stringer is elongated in the first direction; and
the flange protrudes from the first side of the web, parallel to the second direction, along an entire length of the web.

9. The body according to claim 8, wherein the first tab tapers in the second direction away from the second tab such that a thickness of the first tab decreases in the second direction away from the second tab of the stringer.

10. The body according to claim 8, wherein a first combined width of the flange and the first tab is greater than a second width of the second tab.

11. The body according to claim 8, wherein a first thickness of the flange, at a first location adjacent the first tab in the second direction, is greater than a first thickness of the flange, at a second location adjacent the first tab in the first direction.

12. The body according to claim 8, wherein a thickness of the flange, at the first tab and immediately adjacent the web, is equal to a thickness of the second tab immediately adjacent the web.

13. The body according to claim 1, wherein the second tab tapers at an angle between about 0-degrees and about 10-degrees.

14. The body according to claim 1, wherein a thickness of the first tab is constant.

15. The body according to claim 1, wherein the frame further comprises:
a second web, elongated in the second direction and having a frame first side and a frame second side, opposite the frame first side;
a first padup, protruding from the frame first side of the second web in the first direction and extending along an entire length of the second web in the second direction; and
an intersection structure, comprising:
the cut-out, which is formed in the second web and has a third side and a fourth side, opposite the third side, wherein the third side is spaced apart from the fourth side in a third direction, wherein:
the first foot is coupled to and extends, in the first direction from the second web at the third side of the cut-out; and
the second foot is coupled to and extends, in the first direction, from the second web at the fourth side of the cut-out, wherein the second foot is spaced apart from the first foot in a direction parallel to the second direction;
a second padup, protruding from the first padup, in the first direction, at a first localized portion of the second web contiguous with the cut-out;
a third padup, protruding from the frame first side of the second web, in the first direction, at the first localized portion of the second web between the first padup and the first foot and between the first padup and the second foot; and
a fourth padup, protruding from the frame first side of the second web, in the first direction, at a second localized portion of the second web aligned with the cut-out in a fourth direction, perpendicular to the first direction and the second direction, and positioned adjacent the first padup in the fourth direction.

16. The body according to claim 15, wherein:

the cut-out has an asymmetrical shape along a plane parallel with the second direction and the fourth direction; and the cut-out overlaps itself in the fourth direction.

17. The body according to claim 15, wherein the frame second side of the second web does not have a padup.

18. The body according to claim 15, wherein:

the frame comprises a plurality of intersection structures spaced apart along the second web in at least the second direction; and the frame further comprises third flanges each extending from the frame second side of the second web, in the first direction, and each extending, in the second direction, from the first foot of one of the plurality of intersection structures to the second foot of an adjacent one of the plurality of intersection structures.

19. The body according to claim 18, wherein the frame further comprises open spaces, on the frame first side of the second web, each extending, in the second direction, from the first foot of one of the plurality of intersection structures to the second foot of an adjacent one of the plurality of intersection structures.

20. The body according to claim 1, wherein the frame further comprises transition tabs each coupled to a corresponding one of the first foot and the second foot.

\* \* \* \* \*